J. E. EMERSON.
Blanks for Saw-Teeth.
No. 142,780.  Patented September 16, 1873.
Fig. 1.
Fig. 2.
Fig. 3.
Fig. 5.      Fig. 4.
  
Attest:
Jno. D. Patten
N. S. Miller
Inventor:
James E. Emerson
By N. Cranford
atty.

UNITED STATES PATENT OFFICE.

JAMES E. EMERSON, OF BEAVER FALLS, PENNSYLVANIA.

IMPROVEMENT IN BLANKS FOR SAW-TEETH.

Specification forming part of Letters Patent No. 142,780, dated September 16, 1873; application filed June 28, 1873.

*To all whom it may concern:*

Be it known that I, JAMES E. EMERSON, of Beaver Falls, in the county of Beaver, in the State of Pennsylvania, have made a certain new and useful improvement in bars of steel for making removable teeth for saws, of which the following is a specification:

Saw-teeth of almost every form that are removable require the bar of steel from which they are made to be of different shapes, in order to produce teeth economically and waste little or no metal in forming the teeth from such bar of steel; and the object of this invention is to roll the bar of steel from which the teeth are made into such shape as that little or no waste of material will result in making the teeth of a particular shape from such bar of steel.

In the drawings, Figures 1 and 2 represent a side view of the bar of steel in different positions; Fig. 3, a cross-section of the bar; Fig. 4, a blank tooth cut from the bar; and Fig. 5, a finished tooth.

A represents the finished bar of metal as it comes from the rollers, having a flat or plane side, $a$, round back $a'$ terminating at the junction with $a$ in sharp edges $a''$, as seen in Fig. 3. From this bar of steel A the blanks B are cut of a given length, and when so cut are put under a drop-die, and the edges $a''$ are cut off from point $x$ to the inner end or shank of the blank to the width of the thickness or a little more than the thickness of the saw-plate, when the tooth is tempered and ground at the outer end to a sharp cutting-edge, as are also the sides or edges $a''$ that form planing-edges to plane both sides of the kerf cut by the forward edge of the teeth. By this process of making saw-teeth from a bar of steel thus formed, very little metal is wasted, and the saw-teeth so made can be sold very cheap, in fact so cheap that they are never sharpened after becoming once dulled by use, as it is cheaper to buy a new set of teeth than to sharpen the old ones by the ordinary means usually at hand for such purpose, as the teeth are made to be much harder than the usual temper of saw-teeth; hence a file will not dress them.

I am aware that bars of steel have been rolled from which to form removable teeth of saws, but such bars have been made into entirely different shapes, and to make removable teeth of a different form from the teeth herein described; but What I do claim is—

Blanks cut from a rolled steel bar, A, of the shape in cross-section described and shown— that is to say, a bar flat on one side, $a$, round on the back, and terminating in sharp edges $a''$ at the point where it joins the flat side, substantially as and for the purpose described.

JAMES E. EMERSON.

Witnesses:
C. R. LISTER,
JOHN McCARTY.